(12) United States Patent
Pothiawala et al.

(10) Patent No.: US 12,335,257 B2
(45) Date of Patent: Jun. 17, 2025

(54) SYSTEMS AND METHODS FOR AUTHENTICATION FOR USER SUPPORT

(71) Applicant: Capital One Services, LLC, McLean, VA (US)

(72) Inventors: Ihab Pothiawala, Stamford, CT (US); Jude Anasta, Hudson, NY (US)

(73) Assignee: Capital One Services, LLC, McLean, VA (US)

( * ) Notice: Subject to any disclaimer, the term of this patent is extended or adjusted under 35 U.S.C. 154(b) by 226 days.

(21) Appl. No.: 18/152,128

(22) Filed: Jan. 9, 2023

(65) Prior Publication Data

US 2024/0236084 A1    Jul. 11, 2024

(51) Int. Cl.
| G06F 15/16 | (2006.01) |
| G06F 9/54 | (2006.01) |
| H04L 9/40 | (2022.01) |
| H04L 29/06 | (2006.01) |
| H04M 3/51 | (2006.01) |

(52) U.S. Cl.
CPC ...... *H04L 63/0853* (2013.01); *H04M 3/5166* (2013.01)

(58) Field of Classification Search
CPC .......................... H04L 63/0853; H04M 3/5166
USPC ................................................................ 726/7
See application file for complete search history.

(56) References Cited

U.S. PATENT DOCUMENTS

| 6,345,257 | B1 * | 2/2002 | Jarrett | B61L 27/50 |
| | | | | 705/305 |
| 9,609,102 | B1 * | 3/2017 | Cooper | H04M 3/42068 |
| 10,313,519 | B1 * | 6/2019 | Cooper | H04M 3/5166 |
| 10,645,220 | B1 * | 5/2020 | Demsey | H04M 3/493 |
| 10,802,847 | B1 * | 10/2020 | Mahapatra | G06F 11/0793 |
| 10,951,652 | B1 * | 3/2021 | Sharifi Mehr | H04L 63/0807 |
| 11,153,307 | B1 * | 10/2021 | Davey | G06F 3/165 |
| 11,671,422 | B1 * | 6/2023 | Salehpour | H04L 63/18 |
| | | | | 726/7 |
| 12,063,210 | B1 * | 8/2024 | Maeng | H04L 63/083 |
| 2005/0039192 | A1 * | 2/2005 | Chavez | G06F 11/0709 |
| | | | | 719/318 |
| 2010/0278322 | A1 * | 11/2010 | Krantz | H04M 3/382 |
| | | | | 379/93.03 |
| 2014/0040979 | A1 * | 2/2014 | Barton | H04W 12/30 |
| | | | | 726/1 |
| 2016/0269560 | A1 * | 9/2016 | Chandra | H04M 3/2218 |
| 2016/0301771 | A1 * | 10/2016 | Choudhari | H04L 67/01 |
| 2017/0280009 | A1 * | 9/2017 | Burke, Jr. | H04N 1/00973 |
| 2018/0249005 | A1 * | 8/2018 | Dowlatkhah | H04M 3/42059 |
| 2019/0281157 | A1 * | 9/2019 | Gupta | H04L 63/18 |
| 2020/0257708 | A1 * | 8/2020 | Winthers | G06F 16/29 |
| 2023/0032549 | A1 * | 2/2023 | Ciarniello | G06F 21/31 |
| 2023/0069102 | A1 * | 3/2023 | Jaiswal | H04M 1/575 |
| 2024/0054196 | A1 * | 2/2024 | Nainar | H04W 12/06 |

(Continued)

*Primary Examiner* — Hamza N Algibhah
(74) *Attorney, Agent, or Firm* — Foley & Lardner LLP (57) ABSTRACT

In some embodiments, after authentication of a user at a trusted device, a system may store a record with user or other support information and a code in a database. When support is requested by the user device, the code provided in response to the request (e.g., as an extension to a phone number or in a header field), and a system may use the code to retrieve the record from the database. Presence of the record in the database may indicate to the communication system that the user requesting support is already authenticated.

18 Claims, 4 Drawing Sheets

(56) References Cited

U.S. PATENT DOCUMENTS

| | | | |
|---|---|---|---|
| 2024/0056437 A1* | 2/2024 | Martin | G06F 3/1222 |
| 2024/0121236 A1* | 4/2024 | Buchler | H04L 63/083 |
| 2024/0131954 A1* | 4/2024 | Harada | B60L 53/68 |
| 2024/0154950 A1* | 5/2024 | Gean | H04L 63/0853 |
| 2024/0163367 A1* | 5/2024 | Frommelt | H04M 3/42042 |
| 2024/0184661 A1* | 6/2024 | Mishra | G06F 11/0793 |
| 2024/0220348 A1* | 7/2024 | Kumar | G06F 11/0772 |

\* cited by examiner

SYSTEMS AND METHODS FOR AUTHENTICATION FOR USER SUPPORT

SUMMARY

An organization may use user support systems to enable users to contact the organization to receive assistance with various computing systems of the organization. A user support system may include different components to assist with user support.

It is often the case that a user needs to be authenticated or identified before assistance is provided to the user via a user support system. However, existing systems often fail to provide an efficient authentication mechanism. With existing systems, the user may be authenticated with an authentication system, which must then notify a communication or other system that provides data to the support associate helping the user. Further, the authentication system or other system may need to update a database with support information needed to assist the user (e.g., screenshots of mobile app features with which the user is having trouble). Alternatively, the support associate may need to engage directly with the user through a cumbersome process to verify the user's identity.

To improve efficiency and reduce the number of steps that various systems may need to perform to authenticate a user, methods and systems described herein provide a novel authentication by proof-of-storage mechanism. For example, after authentication of a user at a trusted device, the authentication system may store a record with user or other support information and a code in a database. When support is requested by the user device, the code may be provided in response to the request (e.g., as an extension to a phone number or in a header field), and a communication system may use the code to retrieve the record from the database. Presence of the record in the database may indicate to the communication system that the user requesting support is already authenticated. The record may also include other information helpful for assisting the user. By doing so, the number of computational steps required for authentication may be reduced during sessions with the communication system.

In some aspects, a computing system may receive, from a first user device, a communication request (e.g., for a pre-authenticated phone call to a phone number) indicating an issue with a first feature of an application executing on the first user device (e.g., the first feature is not functioning). Based on the communication request and successfully authenticating the first user, the computing system may generate a record associated with a code (e.g., usable to retrieve the record), where the record comprises an identification of the first user, an indication of the first feature, and the code. The computing system may store the record in a database and send the code to the first user device. The computing system may receive, from the first user device, via an interactive voice response system, a phone call to the phone number at an extension number (e.g., for the phone number or associated with the phone call). Based on the extension number matching the code (e.g., the extension number and the code associated with the record is the same), the computing system may retrieve the record associated with the code from the database and determine, from the record, that the first user associated with the phone call has already been authenticated. Based on the first user associated with the phone call having already been authenticated, the computing system may send, to a second user device, a message comprising the record and an indication that the first user associated with the phone call has been authenticated.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
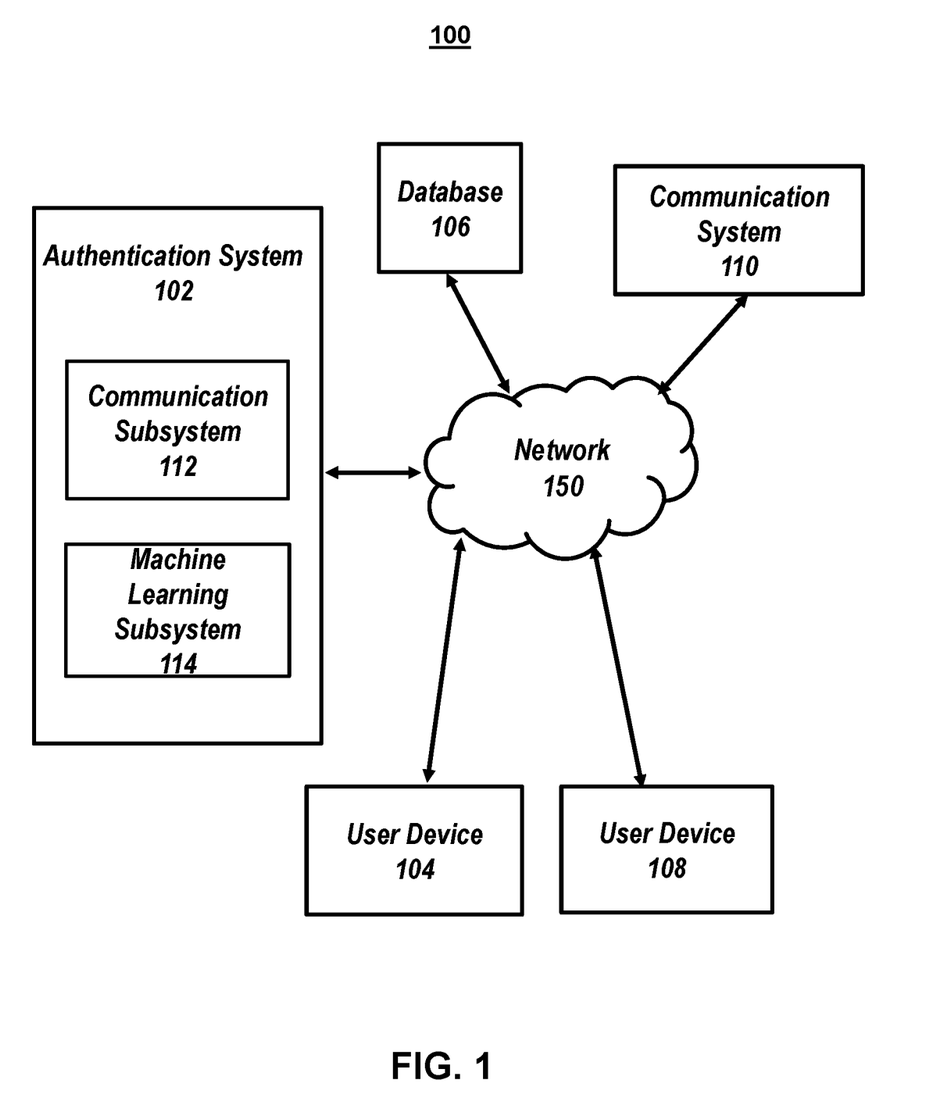
FIG. 1 shows a diagram for an example system that may use record storage as proof of authentication, in accordance with one or more embodiments.

FIG. 1 shows an illustrative system 100 for using record storage as proof of authentication. The system 100 may include an authentication system 102, a database 106, a user device 104, a user device 108, and a communication system 110, all of which may communicate with each other via a network 150. The authentication system 102 may include a communication subsystem 112, a machine learning subsystem 114, or other components. The communication system 110 may include auto dialers, call center monitors, call accounting solutions, call analytics, predictive dialers, computer telephony integration (CTI), interactive voice response (IVR), an automatic call distributor (ACD) or a variety of other components or systems.

The authentication system 102 may receive a request for authentication. For example, a user may request support with a feature in a mobile or web application (e.g., an application that is executing on user device 104) and the application may require the user to be authenticated before support can be provided. After authentication of the user, the system 100 may generate and store a record with user information and a code in a database 106. The application may cause the user device 104 to contact the communication system 110 after authentication. For example, the user may interact with a user interface element associated with user support to cause a request for user support to be sent to the communication system 110. The code may be included in the request (e.g., as an extension to a phone number, in a header field, in a message, or in a variety of other ways) and the communication system 110 may use the code to retrieve the record from the database 106. Presence of the record in the database 106 may indicate to the communication system 110 that the user requesting support is already authenticated. The record may include other information that may be used by a support associate to assist the user. For example, the record may include an indication that the user has been authenticated which may indicate, to the user device 108, that the user may be assisted without performing additional authentication. By doing so, the number of computational steps required for authentication may be reduced because the authentication system need no longer directly send an indication of the authentication to the communication system 110.

The authentication system 102 may receive, from a user device 104, a first request for an authenticated communication. In one example, the communication may be a phone call or an online dialogue (e.g., via a chatbot on a web or other application, via a virtual reality environment, etc.). The first request may be associated with a first feature (e.g., a feature of an application executing on the user device 104, a feature of a service, or other feature). For example, a first user may have issues in creating a new bank account through the bank's mobile application. The first request for the authenticated communication may indicate that the first feature is not functioning. For example, the request sent from the first user's mobile device may indicate that the new-account-opening function on the bank's mobile application is not functioning (e.g., the feature is unresponsive, interacting with the feature did not lead to a desired result, etc.). The first request may indicate contact information that may be used to contact a second user who may be able to assist the first user (e.g., phone number, uniform resource locator for a chat interface, an email address, etc.). For example, the contact information may be used to contact a support associate at the bank who may be able to assist the user with a feature that is not functioning (e.g., the new-account-opening function or other feature).

Figure 2:
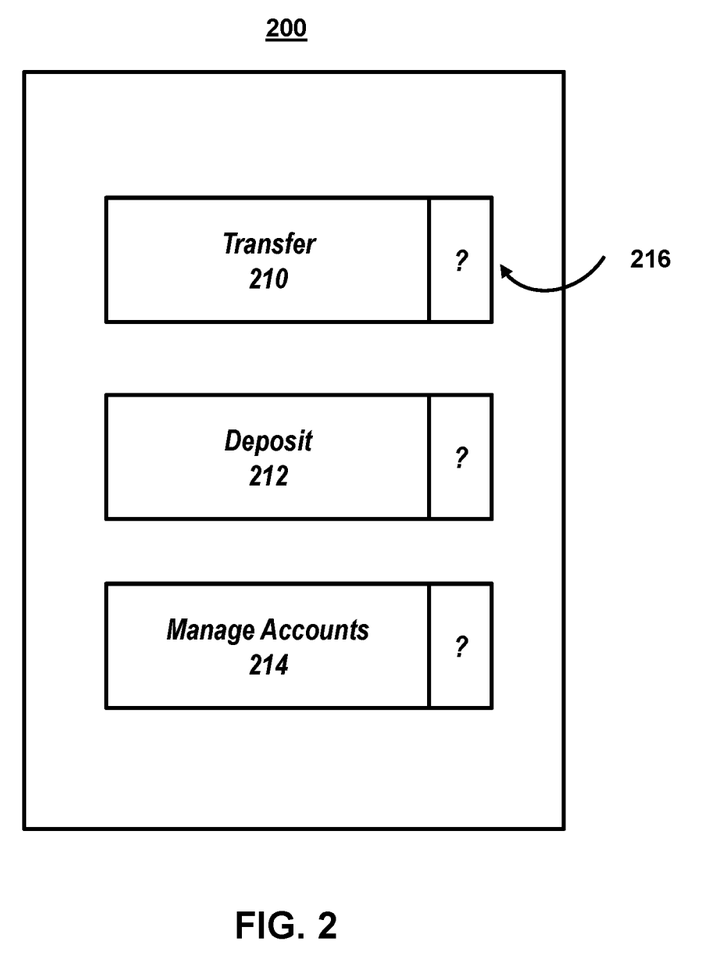
FIG. 2 shows an example user interface that may be used in an authentication process, in accordance with one or more embodiments.

FIG. 2 shows an example user interface 200 that may be used to send a request for communication. The user interface 200 may be part of an application that executes on the user device 104. The user interface 200 may correspond to a banking application that includes a variety of features. For example, the banking application may enable a transfer function 210 to transfer funds, a deposit function 212 to deposit funds, or a manage accounts function 214 to enable a user to change an aspect of an account. The user may be able to request assistance with a feature or function, for example, by interacting with an assistance element 216. Doing so may initiate contact with the authentication system 102 and may enable a user to be pre-authenticated via a record stored in a database as described in more detail below, for example, in connection with FIG. 1.

Referring back to FIG. 1, the authentication system 102 may send a request to authenticate the first user (e.g., the user who sent the first request for a communication). The authentication system 102 may send the second request for authentication to the user device 104, for example, based on the first request for communication. For example, based on the first user requesting a communication through the bank's mobile application, the first user may receive a request for authentication via the bank's mobile application. The request to authenticate the first user may indicate that a one-time passcode should be provided to authenticate the first user. For example, the authentication system 102 may send a request of a randomly generated one-time passcode to the user. In some embodiments, the authentication system 102 may use a biometric (e.g., fingerprint, facial scan, retina scan, or a variety of other biometrics), passwords, or a variety of other methods to authenticate the first user. An indication of the request to authenticate the first user may be shown in the bank's mobile application on the first user's mobile device.

In some embodiments, authenticating the first user may include receiving, by the authentication system 102, first authentication information from the user device 104. The first authentication information may include a passcode, an indication of a fingerprint, facial data associated with the first user, or a variety of other authentication information. For example, the first user may scan his/her fingerprint using the mobile device and the fingerprint data can be transferred to the authentication system 102. Alternatively, a facial recognition function of the first user's mobile device may be activated to scan the first user's face and send collected facial biometric information to the authentication system 102. Based on the first authentication information matching second authentication information stored in the database 106, the authentication system 102 may authenticate the first user. After receiving the first authentication information from the first user's mobile device, the computer system may determine whether the received information matches information stored in the database 106. For example, the computer system may compare the six-digit number received from the first user to a stored one-time passcode. Alternatively, the computer system may compare the received fingerprint information or biometric facial information to fingerprint data or biometric facial data that is stored in a database 106. The authentication system 102 may authenticate the first user, for example, if the comparison shows that the received authentication information matches stored information associated with the first user.

The authentication system 102 may generate a record that corresponds to a user device 104. The record may be generated, for example, based on the first user being successfully authenticated. For example, after the first user is successfully authenticated, the authentication system 102 may generate a record that corresponds to the user device 104. The record may include an identification of the first user, an indication of the first feature (e.g., a feature that is not functioning), or a code. For example, the authentication system 102 may generate a record including an identification of the first user (e.g., name, date of birth, or social security number). As an additional example, the record may include an indication that the new-account-opening function in the bank's mobile application is not working properly. The record may include a code that may be used to retrieve the record. The code may include a set of one or more characters (e.g., alphanumeric characters). The code may include a cryptographic hash. The authentication system 102 may link the record and the code so that the record may be retrieved using the code (e.g., by querying a database 106 using the code). By doing so, the authentication system 102 may be able to authenticate the user privately (e.g., via a mobile device of the first user or within the bank's application) without requiring the first user to speak potentially sensitive information out loud (e.g., in a public environment).

The record may be used by the user device 108 as proof that the user device 104 has already been authenticated, thus enabling the user device 108 to provide information to the user device 104 without requesting additional authentication information. By doing so, the authentication procedure described herein may reduce the risk of cybersecurity incidents that may result from the leaking of user information spoken out loud. Further, because presence of the record in the database 106 may indicate that the user device 104 is authenticated, the authentication system 102 may avoid the need to directly send an indication of the authentication to an additional system (e.g., to the user device 108), thereby reducing the number of computational steps that the authentication system 102 performs and reducing network traffic.

The record may include an indication of the feature for which the user would like support. By creating a record with an indication of the feature, the authentication system 102 may enable a second user to quickly determine the feature for which the user would like assistance and may enable a more efficient support process. The indication of the feature may include a uniform resource locator (URL) associated with the feature. The URL may be a function URL that is a dedicated endpoint for a function that is associated with the feature. For example, the URL may be associated with a function that enables the user to perform a transaction via a banking application.

In some embodiments, the record may include an indication of one or more actions that the first user made while interacting with the application. For example, the record may include an indication that the first user tried to open a new bank account within the bank's mobile application. As an additional example, the record may include an indication that the first user accessed a frequently asked questions (FAQ) section of the application. As an additional example, the record may include an indication of user interface elements that the user interacted with (e.g., clicked, tapped, etc.). As an additional example, the record may include an indication of queries or search terms that the first user input into a search bar.

The authentication system 102 may store the record in a database 106. The record may be stored in a way that allows a query for the code associated with the record to return the record. For example, as described in more detail below, a user device may enter a query for a code that is received at the user device to determine whether a record exists for the code. If a record exists, the user device may display or otherwise output an indication that a user associated with the code has been authenticated by the authentication system 102. By doing so, the authentication system 102 may eliminate the need to send an indication that the user was authenticated to a user device, which may increase the efficiency of the authentication system 102.

The authentication system 102 may send the code to the user device 104. For example, after generating the record described in step 408, the authentication system 102 may send the code (e.g., that is stored in the record) to the user device associated with the first user. The code may be used by the user device to provide proof that the first user has been authenticated. The user device may send the code to a communication system 110 associated with the second user (e.g., a support assistant who may assist the user with the feature that is not functioning). For example, the code may be appended as an extension to a phone number that is dialed by the user device to enable communication between the first user and the second user. Additionally or alternatively, the code may be sent from the user device to a communication system 110 via one or more messages (e.g., via a computer network such as the Internet).

The authentication system 102 may obtain a communication associated with the user device 104. For example, the authentication system 102 may receive, via an interactive IVR system, an indication of a phone call from the user device 104. The indication of the phone call may include an extension number associated with the phone call. In one example, the authentication system 102 may receive an incoming call from the user device 104. The call may include an extension number that matches the code that was sent to the user device 104 (e.g., the extension number is the same as the code, a particular portion of the extension number is the same as the code or vice versa, etc.). In one use case, the user device 104 may have dialed a phone string matching the format [area code]-[7-digit phone number]; [extension number], and the extension number of the phone string may be determined to be the same as the code stored in the record.

The authentication system 102 may retrieve the record from the database 106. Specifically, once the extension number is confirmed to be matching to the code, the record can then be retrieved by the authentication system 102 from the database 106. For example, the authentication system 102 may try to match the extension number associated with the incoming call to the code stored in the database 106. if the extension number matches a code in the database 106, the authentication system 102 may retrieve the corresponding record (e.g., which may include the first user's identification information, an indication of one or more features, or functions that are not working as expected by the user, etc.).

In some embodiments, retrieving the record from the database 106 may include determining, based on a comparison of a time stamp associated with the first code and a current time, that the first code has not expired. For example, the authentication system 102 may set up a time limit (e.g., 60 seconds, five minutes, one hour, 24 hours, etc.) for a generated code. If use of the code is attempted after the time limit, the authentication system 102 may prevent retrieval of the record. As an additional example, the authentication system 102 may delete the record after the time limit expires to prevent it from being used with the expired code. In one example, retrieving the record from the database 106 may include determining, based on a comparison of a time stamp associated with the first code and a current time, that the first code has not expired.

Retrieving the record from the database 106 may include determining that the first code has not been previously used to retrieve the record. For example, the authentication system 102 can be configured to determine whether or not the received-first code has been previously used. For example, the authentication system 102 may store the received-first code in the database 106. After a code is obtained, the computer system may compare the obtained code with previously stored codes to determine whether the newly obtained code has been previously used. Further, the authentication system 102 can retrieve the record based on the first code having not been previously used to retrieve a record.

The authentication system 102 may determine a first user (e.g., or the user device 104) associated with the communication has already been authenticated. For example, based on retrieving the record from the database 106 and based on the extension number matching the code, the authentication system 102 may determine that the first user associated with the phone call has already been authenticated. The authentication system 102 may determine that the first user is authenticated based on retrieving the record from the database 106 and based on the extension number matching the code. For example, presence of a record in the database 106 that is associated with a code that matches the extension number may indicate to the authentication system 102 that the first user has already been authenticated or that an authentication process may be skipped for the first user. Retrieving the record from the database 106 and comparison to the extension number may be performed by a communication system 110.

The authentication system 102 may send a message to a user device 108. For example, based on the first user associated with the phone call having already been authenticated, the authentication system 102 may send, to a user device 108, a message that includes the record and an indication that the first user associated with the phone call has been authenticated. In one example, the user device 108 may be associated with a support assistant associated with an application that the first user would like assistance with. In one example, once the first user who made the call to the bank customer service has been authenticated, the authentication system 102 could send a message including the first user's identification information and an indication that the first user has been authenticated for assistance to a bank's customer service agent. This message may be sent to a computer terminal of the bank's customer service agent for review. By doing so, the first user authentication results and issues for which the first user would like support can be more efficiently performed because the authentication system 102 no longer needs to directly send an indication of the authentication to the communication system 110 (e.g., during the interactions between the customer service agent and the first user).

In some embodiments, the authentication system 102 may use a code (e.g., the code stored with the record as described above) to determine a device to assign a support request to. The authentication system 102 may use a first threshold value and a second threshold value to determine which device a request should be assigned to. For example, the authentication system 102 may determine that the second code is greater than a first threshold value and less than a second threshold value. Based on the second code being greater than the first threshold value and less than the second threshold value, the authentication system 102 may determine a group of devices associated with the first feature (e.g., a plurality of user devices that are assigned to helping users who request assistance in connection with the first feature). The authentication system 102 may select a device from the plurality of user devices and send the message to the selected device.

In some embodiments, the authentication system 102 may perform additional checks to verify the identity of a user who is communicating with a second user (e.g., a support assistant). For example, after the first user begins communicating with the second user, the authentication system 102 may determine whether a voice sample of the communication matches a voice sample associated with the first user. The authentication system 102 may receive a voice sample of the first user. For example, the authentication system 102 may obtain a voice sample from a phone call from the first user. The authentication system 102 may store the voice sample to compare it with future audio to verify the first user's identity. Additionally or alternatively, the first user may send an audio recording to the authentication system 102 (e.g., via the bank's mobile application on the first user's mobile device). After the voice sample of the first user is obtained, the authentication system 102 may generate (e.g., via a machine learning model described below in connection with FIG. 3) a first embedding, for example, based on the voice sample. For example, the authentication system 102 may extract neural network embedding vectors from the layers of a neural network used to evaluate the voice sample. The first embedding may be generated as a continuous vector representing discrete variables of the voice sample in a space spanned by the first embedding. The authentication system 102 may send an indication to a user device 108 that the voice sample of the first user has been authenticated. For example, based on the first embedding satisfying a similarity threshold with a second embedding stored in the database 106, the authentication system 102 may send (e.g., to a user device 108 associated with the second user) an indication that a voice sample of the first user has been authenticated. For example, the second embedding extracted from the first user's voice sample previously collected may be stored in the database 106 connected to the authentication system 102. After the first embedding based on the received voice sample has been generated, the authentication system 102 may compare the first embedding to the stored second embedding for similarity. The authentication system 102 may send an additional indication that the first user has been authenticated to a computer terminal of a bank service agent. If the similarity satisfies the similarity threshold, (e.g., the similarity generated from the comparison being close to or larger than the similarity threshold, a distance metric associated with the first and second embeddings is lower than a threshold distance, etc.).

Figure 3:
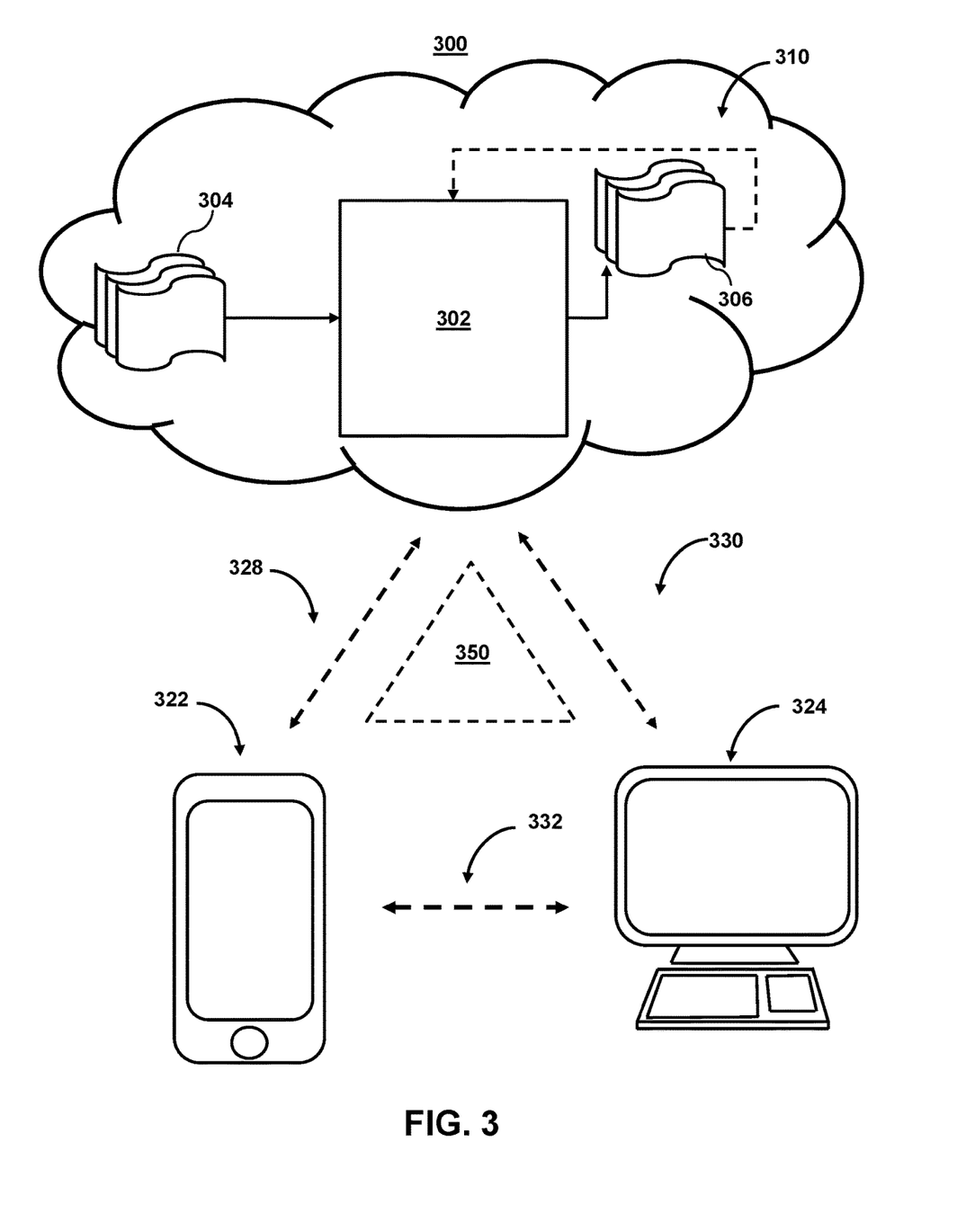
FIG. 3 shows example components for a system that may be used to authenticate a user, in accordance with one or more embodiments.

FIG. 3 shows illustrative components for a system 300 used for training machine learning models or using machine learning models (e.g., to generate an embedding or perform any other action described in connection with FIGS. 1, 2, and 4), in accordance with one or more embodiments. The components shown in system 300 may be used to perform any of the functionality described above in connection with FIG. 1. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, mobile devices, and/or any device or system described in connection with FIGS. 1-2, and 4. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may for instance, utilize one or more devices to interact with one another, one or more servers, or other components of system 300. It should be noted, that, while one or more operations are described herein as being performed by particular components of system 300, these operations may in some embodiments, be performed by other components of system 300. As an example, while one or more operations are described herein as being performed by components of mobile device 322, these operations may in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., data related to authenticating users, or any other action described in connection with FIGS. 1, 2, and 4).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device, such as a computer screen, and/or a dedicated input device such as a remote control, mouse, voice input, etc.). Additionally, the devices in system 300 may run an application (or another suitable program). The application may cause the processors and/or control circuitry to perform operations related to training machine learning models or using machine learning models (e.g., to generate an embedding, assist in authenticating a user, or perform any other action described in connection with FIGS. 1, 2, and 4).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or Long-Term Evolution (LTE) network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices. Cloud components 310 may include the EC system 102 or the user device 104 described in connection with FIG. 1.

Cloud components 310 may include model 302, which may be a machine learning model, artificial intelligence model, etc. (which may be collectively referred to herein as "models"). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, where the first labeled feature input is labeled with a known prediction for the first labeled feature input. The system may then train the first machine learning model to classify the first labeled feature input with the known prediction (e.g., used for training machine learning models or using machine learning models, for example, to generate an embedding or perform any other action described in connection with FIGS. 1, 2, and 4).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

In some embodiments, the model (e.g., model 302) may automatically perform actions based on outputs 306. In some embodiments, the model (e.g., model 302) may not perform any actions. The model (e.g., model 302) may be used to generate an embedding or perform any other action described in connection with FIGS. 1, 2, and 4.

System 300 also includes application programming interface (API) layer 350. API layer 350 may allow the system to generate summaries across different devices. In some embodiments, API layer 350 may be implemented on user device 322 or user terminal 324. Alternatively, or additionally, API layer 350 may reside on one or more of cloud components 310. API layer 350 (which may be a representational state transfer (REST) or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. Simple Object Access Protocol (SOAP) web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying web application firewall (WAF) and distributed denial-of-service (DDoS) protection, and API layer 350 may use RESTful APIs as standard for external integration.

Figure 4:
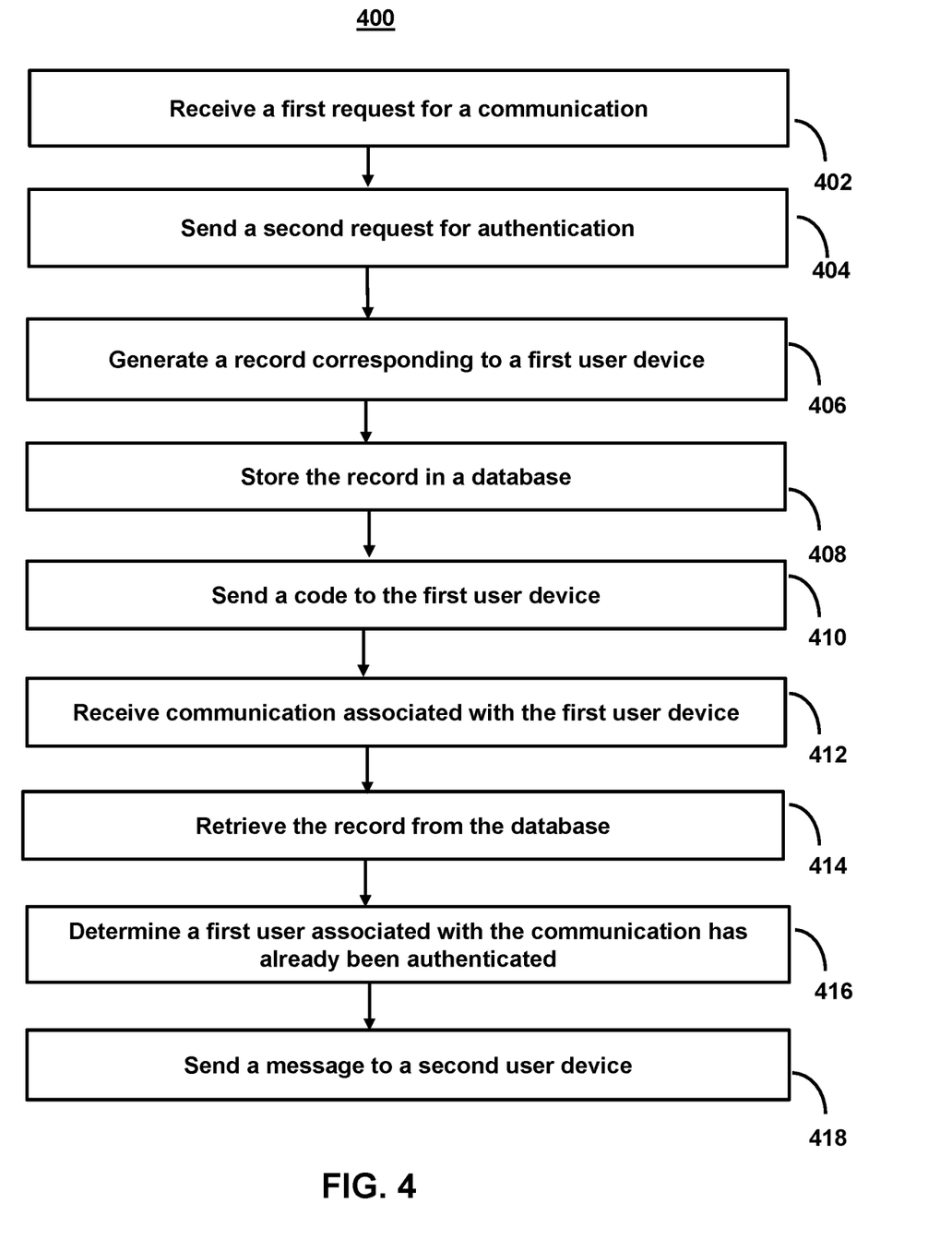
FIG. 4 shows a flowchart of the steps involved in using record storage as proof of authentication, in accordance with one or more embodiments.

FIG. 4 shows a flowchart of the steps involved in reducing the number of computational steps needed to authenticate a first user and provide a second user with information needed to support the first user, in accordance with one or more embodiments. Although described as being performed by a computing system, one or more actions or steps described in connection with process 400 of FIG. 4 may be performed by other devices shown in FIGS. 1-3. The processing operations presented below are intended to be illustrative and non-limiting. In some embodiments, for example, the method may be accomplished with one or more additional operations not described or without one or more of the operations discussed. Additionally, the order in which the processing operations of the methods are illustrated (and described below) is not intended to be limiting.

At step 402, a computing system may receive a first request for a communication. For example, the computing system may receive, from a first user device, a first request for an authenticated communication. In one example, the communication may be a phone call or an online dialogue (e.g., via a chatbot on a web or other application, via a virtual reality environment, etc.). The first request may be associated with a first feature of an application executing on the first user device. For example, a first user may have issues in creating a new bank account through the bank's mobile application. The first request for the authenticated communication may indicate that the first feature is not functioning. For example, the request sent from the first user's mobile device may indicate that the new-account-opening function on the bank's mobile application is not functioning (e.g., the feature is unresponsive, interacting with the feature did not lead to a desired result, etc.). The first request may indicate contact information that may be used to contact a second user who may be able to assist the first user (e.g., phone number, URL for a chat interface, an email address, etc.). For example, the contact information may be used to contact a support associate at the bank who may be able to assist the user with a feature that is not functioning (e.g., the new-account-opening function or other feature).

At step 404, the computing system may send a request to authenticate the first user (e.g., the user who sent the first request for a communication described in step 402). The computing system may send the second request for authentication to the first user device, for example, based on the first request for communication. For example, based on the first user requesting a communication through the bank's mobile application, the first user may receive a request for authentication via the bank's mobile application. The request to authenticate the first user may indicate that a one-time passcode should be provided to authenticate the first user. For example, the computing system may send a request of a six-digit, randomly generated, one-time passcode to the user. In some embodiments, the computing system may use a biometric (e.g., fingerprint, facial scan, retina scan, or a variety of other biometrics), passwords, or a variety of other methods to authenticate the first user. An indication of the request to authenticate the first user may be shown in the bank's mobile application on the first user's mobile device.

In some embodiments, authenticating the first user may include receiving, by the computing system, first authentication information from the first user device. The first authentication information may include a passcode, an indication of a fingerprint, facial data associated with the first user, or a variety of other authentication information. For example, the first user may scan his/her fingerprint using the mobile device and the fingerprint data can be transferred to the computing system. Alternatively, a facial recognition function of the first user's mobile device may be activated to scan the first user's face and send collected facial biometric information to the computing system. Based on the first authentication information matching second authentication information stored in the database, the computing system may authenticate the first user. After receiving the first authentication information from the first user's mobile device, the computer system may determine whether the received information matches information stored in the database. For example, the computer system may compare the six-digit number received from the first user to a stored one-time passcode. Alternatively, the computer system may compare the received fingerprint information or biometric facial information to fingerprint data or biometric facial data that is stored in a database. The computing system may authenticate the first user, for example, if the comparison shows that the received-first authentication information matches stored information associated with the first user.

At step 406, the computing system may generate a record that corresponds to a first user device. The record may be generated, for example, based on the first user being successfully authenticated. For example, after the first user is successfully authenticated, the computing system may generate a record that corresponds to the first user device. The record may include an identification of the first user, an indication of the first feature (e.g., a feature that is not functioning), or a code. For example, the computing system may generate a record including an identification of the first user (e.g., name, date of birth, or social security number). As an additional example, the record may include an indication that the new-account-opening function in the bank's mobile application is not functioning. The record may include a code that may be used to retrieve the record. The code may be any code described above in connection with FIG. 1. The computing system may link the record and the code so that the record may be retrieved using the code (e.g., by querying a database using the code). By doing so, the computing system may be able to authenticate the user privately (e.g., via a mobile device of the first user or within the bank's application) without requiring the first user to speak potentially sensitive information out loud (e.g., in a public environment). The record may be used by a second user as proof that the first user has already been authenticated, thus enabling the second user to assist the first user without requesting additional authentication information. Therefore, the authentication procedure described herein may reduce the risk of cybersecurity incidents that may result from the leaking of user information spoken out loud. Further, because presence of the record in the database may indicate that the first user is authenticated, the computing system may avoid the need to directly send an indication of the authentication to an additional system (e.g., to the user device used by the second user who is assisting the first user), thereby reducing the number of computational steps that the computing system performs and reducing network traffic.

The record may include an indication of the feature for which the user would like support. By creating a record with an indication of the feature, the computing system may enable a second user to quickly determine the feature for which the user would like assistance and may enable a more efficient support process. The indication of the feature may include a URL associated with the feature. The URL may be a function URL that is a dedicated endpoint for a function that is associated with the feature. For example, the URL may be associated with a function that enables the user to perform a transaction via a banking application.

In some embodiments, the record may include an indication of one or more actions that the first user made while interacting with the application. For example, the record may include an indication that the first user tried to open a new bank account within the bank's mobile application. As an additional example, the record may include an indication that the first user accessed a FAQ section of the application. As an additional example, the record may include an indication of user interface elements that the user interacted with (e.g., clicked, tapped, etc.). As an additional example, the record may include an indication of queries or search terms that the first user input into a search bar.

At step 408, the computing system may store the record in a database. The record may be stored in a way that allows a query for the code associated with the record to return the record. For example, as described in more detail below, a user device may enter a query for a code that is received at the user device to determine whether a record exists for the code. If a record exists, the user device may display or otherwise output an indication that a user associated with the code has been authenticated by the computing system. By doing so, the computing system may eliminate the need to send an indication that the user was authenticated to a user device, which may increase the efficiency of the computing system.

At step 410, the computing system may send the code to the first user device. For example, after generating the record described in step 408, the computing system may send the code (e.g., that is stored in the record) to the user device associated with the first user. The code may be used by the user device to provide proof that the first user has been authenticated. The user device may send the code to a communication system associated with the second user (e.g., a support assistant who may assist the user with the feature that is not functioning). For example, the code may be appended as an extension to a phone number that is dialed by the user device to enable communication between the first user and the second user. Additionally or alternatively, the code may be sent from the user device to a communication system in a message (e.g., via a computer network such as the Internet).

At step 412, the computing system may obtain a communication associated with the first user device. For example, the computing system may receive, via an IVR system, an indication of a phone call from the first user device. The indication of the phone call may include an extension number associated with the phone call. In one example, the computing system may receive an incoming call from the first user device. The call may include an extension number that matches the code that was sent to the first user device in step 410.

At step 414, the computing system may retrieve the record from the database. Specifically, once the extension number is confirmed to be matching to the code, the record can then be retrieved by the computing system from the database. For example, the computing system may try to match the extension number associated with the incoming call to the code stored in the database. If the extension number matches a code in the database, the computing system may retrieve the corresponding record, which may include the first user's identification information, an indication of one or more features, or functions that are not working as expected by the user, etc.

In some embodiments, retrieving the record from the database may include determining, based on a comparison of a time stamp associated with the first code and a current time, that the first code has not expired. For example, the computing system may set up a time limit (e.g., 60 seconds, five minutes, one hour, 24 hours, etc.) for a generated code. If use of the code is attempted after the time limit, the computing system may prevent retrieval of the record. As an additional example, the computing system may delete the record after the time limit expires to prevent it from being used with the expired code. In one example, retrieving the record from the database may include determining, based on a comparison of a time stamp associated with the first code and a current time, that the first code has not expired.

Retrieving the record from the database may include determining that the first code has not been previously used to retrieve the record. For example, the computing system can be configured to determine whether or not the received-first code has been previously used. For example, the computing system may store the received-first code in the database. After a code is obtained, the computer system may compare the obtained code with previously stored codes to determine whether the newly obtained code has been previously used. Further, the computing system can retrieve the record based on the first code having not been previously used to retrieve a record.

At step 416, the computing system may determine a first user associated with the communication has already been authenticated. For example, based on retrieving the record from the database and based on the extension number matching the code, the computing system may determine that the first user associated with the phone call has already been authenticated. The computing system may determine that the first user is authenticated based on retrieving the record from the database and based on the extension number matching the code. For example, presence of a record in the database that is associated with a code that matches the extension number may indicate to the computing system that the first user has already been authenticated or that an authentication process may be skipped for the first user. The retrieval of the record from the database and comparison to the extension number may be performed by a communication system.

At step 418, the computing system may send a message to a second user device. For example, based on the first user associated with the phone call having already been authenticated, the computing system may send, to a second user device, a message that includes the record and an indication that the first user associated with the phone call has been authenticated. In one example, the second user device may be associated with a support assistant associated with an application that the first user would like assistance with. In one example, once the first user who made the call to the bank customer service has been authenticated, the computing system could send a message including the first user's identification information and an indication that the first user has been authenticated for assistance to a bank's customer service agent. This message may be sent to a computer terminal of the bank's customer service agent for review. By doing so, the first user authentication results and issues for which the first user would like support can be more efficiently performed because the computing system no longer needs to directly send an indication of the authentication to the communication system (e.g., during the interactions between the customer service agent and the first user).

In some embodiments, the computing system may use the code (e.g., the code generated in step 406 above) to determine a device to assign a support request to. The computing system may use a first threshold value and a second threshold value to determine which device a request should be assigned to. For example, the computing system may determine that the second code is greater than a first threshold value and less than a second threshold value. Based on the second code being greater than the first threshold value and less than the second threshold value, the computing system may determine a group of devices associated with the first feature (e.g., a plurality of user devices that are assigned to helping users who request assistance in connection with the first feature). The computing system may select a device from the plurality of user devices and send the message to the selected device.

As an additional example, the first and the second threshold values can be configured to be 100000 and 200000, 200000 and 300000, 300000 and 400000, or 400000 and 500000. The computing device may be configured to determine that the received second code is greater than a first threshold value and less than a second threshold value. For example, the first user may send a second code (e.g., a six-digit number) to the computing system. The computing system can determine that the received second code 130000 is greater than the first threshold value of 100000 and less than the second threshold value of 200000. In addition, the computing may determine, based on the second code being greater than the first threshold value and less than the second threshold value, a plurality of user devices associated with the first feature. In this example, the bank may have a plurality of groups of computer terminals, each group of computer terminals corresponding to a second code falling into the range between the first threshold value and the second threshold value. For example, the computing system may regulate a first group of computer terminals and service agents to deal with a specific type of customer service request (e.g., opening a new bank account) and link this type of customer service to the first and second threshold values of 100000 and 200000. When a first user-provided second code (e.g., 130000) is determined to be greater the first threshold value of 100000 and less than the second threshold value of 200000, the computing system can determine the first feature and corresponding first group of computer terminals and service agents.

In some embodiments, the computing system may receive a communication associated with a third user of a third user device. For example, after communicating with a first user who was struggling with operating the bank's mobile application on the first mobile device, the computing system may receive another request for a phone call (e.g., a pre-authenticated phone call) from a second customer through another mobile device. The first mobile device and the second mobile device may have different serial numbers that are included in the requests and that can be distinguished by the computing system. In addition, the computing system may receive an indication that includes a third code from the third user device. For example, the second customer may send a phone call to the bank's customer service center, the phone call including a customer service phone number and a third code as an extension number. The third code may be a six-digit number following the customer service phone number. The computing system may reject the second request based on determining that the third code has expired. For example, the computing system may compare a current time with a time stamp of the third code to determine whether the current time is less than the time stamp of the third code. The computing system may reject the request from the second customer if the third code is determined to be expired.

The computing system can further select the second user device from the plurality of user devices. For example, the computing system may select one computer terminal and corresponding customer service agent from the determined first group of computer terminals and service agents, directing the customer's phone call to the selected customer service agent. Meanwhile, the computing system may send the message to the selected computer terminal. For example, the computing system can send the customer's identification information and a message indicating that the customer has been authenticated to the computer terminal of the selected customer service agent.

In some embodiments, the computing system may perform additional checks to verify the identity of a user who is communicating with a second user (e.g., a support assistant). For example, after the first user begins communicating with the second user, the computing system may determine whether a voice sample of the communication matches a voice sample associated with the first user. The computing system may receive a voice sample of the first user. For example, the computing system may obtain a voice sample from a phone call from the first user. The computing system may store the voice sample to compare it with future audio to verify the first user's identity. Additionally or alternatively, the first user may send an audio recording to the computing system (e.g., via the bank's mobile application on the first user's mobile device). After the voice sample of the first user is obtained, the computing system may generate (e.g., via a machine learning model described above in connection with FIG. 3) a first embedding, for example, based on the voice sample. For example, the computing system may extract neural network embedding vectors from the layers of a neural network used to evaluate the voice sample. The first embedding may be generated as a continuous vector representing discrete variables of the voice sample in a space spanned by the first embedding. The computing system may send an indication to a second user device that the voice sample of the first user has been authenticated. For example, based on the first embedding satisfying a similarity threshold with a second embedding stored in the database, the computing system may send (e.g., to a second user device associated with the second user) an indication that a voice sample of the first user has been authenticated. For example, the second embedding extracted from the first user's voice sample previously collected may be stored in the database connected to the computing system. After the first embedding based on the received voice sample has been generated, the computing system may compare the first embedding to the stored second embedding for similarity. The computing system may send an additional indication that the first user has been authenticated to a computer terminal of a bank service agent, for example, if the similarity satisfies the similarity threshold (e.g., a similarity score generated based on the first and second embeddings is larger than a similarity threshold score, a distance metric associated with the first and second embeddings is lower than a threshold distance, etc.).

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving a request related to a first feature (e.g., wherein the request for the communication indicates that the first feature is not functioning or has an issue); based on the request (e.g., and based on successfully authenticating a first user), generating a record associated with a first code (e.g., a record corresponding to the first user device, the first user, the request, etc.), wherein the record comprises an identification of the first user, an indication of the first feature, a first code, or other data related to the request; receiving, from a first user device or the first user, a communication indicating a second code; based on the second code matching the first code, retrieving the record associated with the first code from a database; and sending, to a second user device, a message comprising an indication that the first user has been authenticated.

2. The method of any of the preceding embodiments, wherein the indication of the first feature comprises a URL associated with the first feature or an indication of actions the first user has previously made within an application (e.g., the application having the first feature and executing on the first user device).

3. The method of any of the preceding embodiments, wherein retrieving the record from the database comprises: determining, based on a comparison of a time stamp associated with the first code and a current time, that the first code has not expired; and wherein sending the message is based on the first code having not expired.

4. The method of any of the preceding embodiments, wherein sending the message comprises: determining that the second code is greater than a first threshold value and less than a second threshold value; based on the second code being greater than the first threshold value and less than the second threshold value, determining a plurality of user devices associated with the first feature; selecting the second user device from the plurality of user devices; and sending the message to the second user device.

5. The method of any of the preceding embodiments, wherein retrieving the record from the database comprises: determining that the first code has not been previously used to retrieve the record; and based on the first code having not been previously used to retrieve the record, retrieving the record.

6. The method of any of the preceding embodiments, further comprising: receiving a voice sample of the first user; generating, via a machine learning model, a first embedding based on the voice sample; and based on the first embedding satisfying a similarity threshold with a second embedding stored in the database, sending, to the second user device, an indication that the voice sample of the first user has been authenticated.

7. The method of any of the preceding embodiments, wherein successfully authenticating the first user comprises: receiving the first authentication information comprising a passcode, an indication of a fingerprint, or facial data associated with the first user; and based on the first authentication information matching second authentication information stored in the database, authenticating the first user.
8. The method of any of the preceding embodiments, further comprising: receiving a second request for a communication associated with a third user of a third user device; receiving, from the third user device, a communication, wherein the indication comprises a third code; and based on determining that the third code has expired, rejecting the second request.
9. The method of any of the preceding embodiments, wherein the message comprises the record.
10. The method of any of the preceding embodiments, further comprising: subsequent to generating the record, sending the first code to the first user device.
11. The method of any of the preceding embodiments, wherein the first feature is a feature of an application executing on the first user device.
12. A tangible, non-transitory, machine-readable medium storing instructions that, when executed by a data processing apparatus, cause the data processing apparatus to perform operations comprising those of any of embodiments 1-11.
13. A system comprising one or more processors; and memory storing instructions that, when executed by the processors, cause the processors to effectuate operations comprising those of any of embodiments 1-11.
14. A system comprising means for performing any of embodiments 1-11.

What is claimed is:

1. A system for pre-authenticating a first user for an interaction with a second user by using authentication via a trusted device to generate a record in a database that is linked with a phone number extension, the phone number extension indicating that the first user has been authenticated, the system comprising: one or more processors and memory storing instructions that, when executed by the one or more processors, cause operations comprising: receiving, from a first user device, a communication request for a pre-authenticated phone call to a phone number, wherein the communication request indicates a malfunction with a first feature of an application executing on the first user device; based on the communication request and successfully authenticating the first user, generating a record associated with a code useable to retrieve the record, storing the record in a database, and sending the code to the first user device, the record comprising an identification of the first user, an indication of the first feature, and the code; in response to sending the code, receiving, from the first user device via an interactive voice response system, a phone call to the phone number at an extension number for the phone number; based on the extension number matching the code, retrieving the record from the database and using the record to determine that the first user associated with the phone call has already been authenticated; and based on the first user associated with the phone call having already been authenticated, sending, to a second user device, a message related to the record, the message comprising the indication of the first feature and an authenticated status of the first user associated with the phone call.

2. The system of claim 1, wherein the communication request comprises (i) a uniform resource locator associated with the first feature or (ii) an indication of actions the first user has previously made within the application.

3. The system of claim 1, wherein the instructions, when executed, cause operations further comprising: receiving a voice sample of the first user; generating, via a machine learning model, a first embedding based on the voice sample; and based on the first embedding satisfying a similarity threshold with a second embedding stored in the database, sending, to the second user device, an indication that the voice sample of the first user has been authenticated.

4. The system of claim 1, wherein successfully authenticating the first user comprises: receiving first authentication information comprising a passcode, an indication of a fingerprint, or facial data associated with the first user; and based on the first authentication information matching second authentication information stored in the database, authenticating the first user.

5. A method comprising: receiving, from a first user device, a request for a pre-authenticated call, the request indicating an issue with a first feature of an application executing on the first user device; based on the request indicating the issue with the first feature, sending, to the first user device, a request for authentication; based on successfully authenticating a first user, generating a record associated with a first code useable to retrieve the record, the record comprising an identification of the first user and an indication of the first feature; storing the first code and the record in a database; subsequent to storing the first code and the record in the database, receiving, from the first user device, a communication indicating a second code; based on the second code matching the first code, retrieving the record associated with the first code from the database and sending, to a second user device, a message comprising the indication of the first feature and an authenticated status of the first user; receiving a second request associated with a user of a third user device; receiving, from the third user device, a second communication comprising a third code; and based on determining that the third code has expired, rejecting the second request.

6. The method of claim 5, wherein the request comprises a uniform resource locator associated with the first feature or an indication of actions the first user has previously made within the application.

7. The method of claim 5, wherein retrieving the record from the database comprises determining, based on a comparison of a time stamp associated with the first code and a current time, that the first code has not expired, and wherein sending the message is based on the first code having not expired.

8. The method of claim 5, wherein sending the message comprises: determining that the second code is greater than a first threshold value and less than a second threshold value;
based on the second code being greater than the first threshold value and less than the second threshold value, determining a plurality of user devices associated with the first feature;
selecting the second user device from the plurality of user devices; and sending the message to the second user device based on the selection of the second user device.

9. The method of claim 5, wherein retrieving the record from the database comprises: determining that the first code has not been previously used to retrieve the record; and based on the first code having not been previously used to retrieve the record, retrieving the record.

10. The method of claim 5, further comprising: receiving a voice sample of the first user; generating, via a machine learning model, a first embedding based on the voice sample; and based on the first embedding satisfying a similarity threshold with a second embedding stored in the database, sending, to the second user device, an indication that the voice sample of the first user has been authenticated.

11. The method of claim 5, wherein successfully authenticating the first user comprises: receiving first authentication information comprising a passcode, an indication of a fingerprint, or facial data associated with the first user; and based on the first authentication information matching second authentication information stored in the database, authenticating the first user.

12. One or more non-transitory computer-readable media comprising instructions that when executed by one or more processors, cause operations comprising: receiving, from a first user device, a request indicating an issue with a first feature; based on the request indicating the first feature and successfully authenticating a first user, generating a record associated with a first code usable to retrieve the record, the record comprising an identification of the first user and an indication of the first feature; subsequent to generating the first code, receiving, from the first user device, a communication indicating a second code; and based on the second code matching the first code, retrieving the record associated with the first code from a database and sending, to a second user device, the indication of the first feature and an indication that the first user has been authenticated, wherein sending the indication of the first feature and the indication that the first user has been authenticated comprises: determining that the second code is greater than a first threshold value and less than a second threshold value; based on the second code being greater than the first threshold value and less than the second threshold value, determining a plurality of user devices associated with the first feature; selecting the second user device from the plurality of user devices; and based on the selection of the second user device, sending the indication of the first feature to the second user device.

13. The one or more non-transitory computer-readable media of claim 12, wherein the request comprises a uniform resource locator associated with the first feature or an indication of actions the first user has previously made within an application.

14. The one or more non-transitory computer-readable media of claim 12, wherein retrieving the record from the database comprises determining, based on a comparison of a time stamp associated with the first code and a current time, that the first code has not expired, and wherein sending the indication of the first feature is based on the first code having not expired.

15. The one or more non-transitory computer-readable media of claim 12, wherein retrieving the record from the database comprises: determining that the first code has not been previously used to retrieve the record; and based on the first code having not been previously used to retrieve the record, retrieving the record.

16. The one or more non-transitory computer-readable media of claim 12, wherein the instructions, when executed, cause operations further comprising: receiving a voice sample of the first user; generating, via a machine learning model, a first embedding based on the voice sample; and based on the first embedding satisfying a similarity threshold with a second embedding stored in the database, sending, to the second user device, an indication that the voice sample of the first user has been authenticated.

17. The one or more non-transitory computer-readable media of claim 12, wherein successfully authenticating the first user comprises: receiving first authentication information comprising a passcode, an indication of a fingerprint, or facial data associated with the first user; and based on the first authentication information matching second authentication information stored in the database, authenticating the first user.

18. The one or more non-transitory computer-readable media of claim 12, wherein the instructions, when executed, cause operations further comprising: receiving a second request associated with a third user of a third user device; receiving, from the third user device, a second communication indicating a third code; and based on determining that the third code has expired, rejecting the second request.

* * * * *